UNITED STATES PATENT OFFICE 2,449,612

SYNTHETIC RUBBERLIKE MATERIALS

William C. Mast, Philadelphia, Chessie E. Rehberg, Glenside, and Charles H. Fisher, Abington, Pa., assignors to the United States of America as represented by the Secretary of Agriculture No Drawing. Application October 27, 1944, Serial No. 560,586

5 Claims. (Cl. 260—78.3)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

The present invention relates to synthetic rubbers prepared from alkyl acrylate polymers and copolymers. As used herein, "alkyl acrylate" denotes an alkyl ester of acrylic acid.

It is known that the polymers of methyl acrylate, ethyl acrylate and other normal alkyl acrylates are soft and flexible. Furthermore, it is known that useful flexible materials can be made by blending alkyl acrylate polymers with certain other materials or by incorporating fillers and pigments into them. The resulting products, however, lack some of the desirable characteristics found in rubber and certain synthetic rubbers, and several unsuccessful attempts have been made to transform the flexible alkyl acrylate polymers into true synthetic rubbers. Vulcanization does not occur when alkyl acrylate polymers such as polymethyl acrylate and polyethyl acrylate, are heated with sulfur. We have attempted vulcanization by heating such polymers containing sulfur and mixtures of such polymers, sulfur, carbon black and accelerators without successful results. No appreciable change is brought about by heating such mixtures and the products lack many of the desirable properties found in vulcanized rubber and vulcanized synthetic rubbers.

An object of this invention is accordingly to produce vulcanized alkyl acrylate polymers having enhanced rubberlike properties and capable of being used in place of rubber.

A further object is to prepare alkyl acrylate polymers which can be compounded and milled on standard rubber rolls and equipment and cured or vulcanized in standard rubber moulds to give vulcanized rubberlike products.

A further object is to produce synthetic rubbers which have greater resistance to oils, oxidation and aging than natural rubber and some of the previously described synthetic rubbers.

A further object is to provide synthetic rubbers which can be made from carbohydrates, an abundant and reproducible raw material.

A further object is to provide methods for copolymerizing methyl acrylate, ethyl acrylate and similar alkyl acrylates, particularly methods of polymerization which permit linear growth but prevent or retard cross-linkage, thus giving polymers having olefinic unsaturation available for vulcanization. Other objects and advantages of our invention will appear from the following description.

We have found that synthetic rubbers can be made by copolymerizing methyl acrylate and other alkyl acrylates with small quantities of polyfunctional polymerants, such as allyl maleate, methallyl fumarate, allyl lactate maleate, crotyl acrylate, furfuryl acrylate, and furfuryl methacrylate, mixing the resulting copolymers with sulfur, carbon black and vulcanization accelerators known to accelerate the sulfur vulcanization of natural rubber, and other materials commonly employed in the vulcanization of rubber, and heating the resulting mixtures under the general conditions commonly used to vulcanize rubber and other synthetic rubbers. We have found that the alkyl acrylate copolymer can be vulcanized when the copolymer is prepared from a monomer mixture containing an alkyl acrylate and a polyfunctional monomer in the proportion, by weight, of from 80 to 98% of alkyl acrylate to at least 2% of the polyfunctional monomer, although as much as 5, 10, or 20% of the latter can be used.

The copolymerization can be effected by using emulsion, mass, or solution polymerization methods to give vulcanizable alkyl acrylate copolymers. Although the polymerization can be conducted in the presence of known polymerization regulators which prevent or retard cross linkage and thus exert a beneficial effect on the process, such as certain mercaptans, acrylonitrile, or both (the use of dodecyl mercaptan and acrylonitrile being particularly satisfactory), and others such as carbon tetrachloride, hexachloroethane, xanthogen disulfide, and trichloropropionitrile, vulcanizable alkyl acrylate copolymers can be made without their use.

The methods used to convert alkyl acrylates into synthetic rubbers by our invention will now be described, but it will be understood that the invention is not limited to these examples.

Emulsion polymerization was used in several instances to prepare the copolymers, but the copolymers may be made by solution or mass polymerization. Emulsion polymerization was used to prepare the polymers shown in the table. In experiment 23 the following method was used: The monomer mixture (85 g. methyl acrylate, 10 g. 2-ethylhexyl acrylate and 5 g. allyl maleate) was added with stirring to a 500 ml. three-neck flask fitted with a reflux condenser, which contained 150 ml. water and 2 g. of a soltuion of cetyl dimethyl benzyl ammonium chloride. The mixture was heated to refluxing temperature, allowed to cool until refluxing ceased, and small quantities of 30 percent hydrogen peroxide (total, 2 ml.) were added until polymerization started. The mixture was then allowed or caused to reflux for one hour. After cooling, the polymer was coagulated by the addition of small quantities of an acetic acid-calcium chloride mixture. The polymer was washed and dried prior to compounding and curing.

Using standard rubber rolls, the following ingredients were milled into 100 parts by weight of the copolymers: 0.5 part mercaptobenzothiazole, 5.0 parts zinc oxide, 2 parts stearic acid, 2 parts sulfur, 30 parts carbon black, and 1 part tetramethylthiuram disulfide. The compounded mixtures were cured in standard rubber moulds at about 298° F. for periods varying from 15 to 120 minutes. The cured products were soft and rubberlike. The tensile strengths and ultimate elongations were as high as 1400 lbs. per square inch and 800%, respectively.

The allyl lactate maleate listed in the table was prepared by allowing allyl lactate to react with maleic anhydride. Other polymerizable esters containing two or more olefinic linkages may be made by condensing methallyl glycolate, alkenyl lactates such as allyl lactate, crotyl lactate, chloroallyl lactate and similar alkenyl hydroxy esters with phthalic anhydride, fumaryl chloride, acrylyl chloride, crotonic anhydride, furoic acid, adipic acid and similar compounds. These esters may be polymerized with alkyl acrylates or monoolefinic acrylic esters according to our invention to prepare vulcanizable acrylate copolymers.

This invention is a valuable advance in the art as it extends the range of known rubber substitutes, giving new substitutes for rubber which have in some respects advantages over rubber. Furthermore, the synthetic rubbers described herein can be made almost entirely—through lactic acid as intermediate—from carbohydrates, an abundant, domestic and reproducible raw material. The source of the small amount of polyfunctional polymerant used in making the copolymer is relatively unimportant because only small proportions are required and many types can be used. It will occur to those skilled in the art that many polyfunctional monomers, such as cinnamyl acrylate, allyl furoate, methallyl itaconate, allyl acid maleate, vinyl crotonate, furfuryl methacrylate, allyl ether, vinyl ether, divinyl benzene, and diallyl phthalate, can be used instead of the monomers listed in the table to prepare vulcanizable alkyl acrylate copolymers. The vulcanizable synthetic rubbers made previously from alkyl acrylates contain large proportions of butadiene and, hence, are essentially butadiene products. Moreover, it is reported that these synthetic rubbers are unsatisfactory. Our products are essentially alkyl acrylate copolymers which can be vulcanized by virtue of a small amount of unsaturation. Vulcanization or cross-linkage of our unsaturated alkyl acrylate copolymers can be effected by treatment with benzoyl peroxide and by similar methods.

Vulcanizable alkyl acrylate copolymers of the type described herein can be made by other methods which will occur to those skilled in the art. For example, a vulcanizable alkyl acrylate copolymer would be obtained by treating a copolymer made from 95 parts methyl acrylate and 5 parts acrylyl chloride with an unsaturated alcohol, amine or mercaptan. A vulcanizable alkyl acrylate copolymer could be obtained also by removal of HCl from a copolymer prepared from about 95 parts of alkyl acrylate and about 5 parts of vinyl chloride or some other halogen-containing monomer. As shown by our invention, any alkyl acrylate copolymer composed almost entirely of alkyl acrylate units but containing olefinic double bonds may be vulcanized by the method herein outlined. Moreover, various emulsifiers, catalysts, stabilizers, and so forth, may be used in the polymerization, and various accelerators, fillers, pigments, extenders, and so forth, may be used for compounding.

Although it is preferred to use only a small proportion of the polymerizable ester containing two or more olefinic linkages, it is possible to use larger proportions. For example, 2 to 10 percent of crotyl acrylate is adequate when mixtures of methyl or other alkyl acrylate and crotyl acrylate are copolymerized, but larger amounts of the crotyl acrylate can be used. In extreme cases it is possible to polymerize the polyfunctional monomer such as crotyl acrylate alone and then vulcanize the unsaturated polymer.

As many apparently widely different embodiments of this invention may be made without departing from the spirit and scope thereof, it is to be understood that we do not limit ourselves to the specific embodiments thereof except as defined in the appended claims.

Table.—Polymerization of acrylic esters in the presence of polyfunctional monomers [1]

| Expt. No. | Monomers, grams | Water, ml. | Cetyldimethyl ammonium chloride, g. | Time, min. | Catalyst, ml. |
|---|---|---|---|---|---|
| 1 | Ethyl acrylate (90), allyl lactate maleate [2] (10) | 150 | 2.0 | 60 | $H_2O_2$ (1). |
| 2 | Methyl acrylate (120), butyl acrylate (60), allyl lactate maleate (20) | 250 | 3.0 | 80 | $H_2O_2$ (1). |
| 3 | Ethyl acrylate (500), allyl maleate (55) | 700 | 8.5 | 30 | $H_2O_2$ (5.5). |
| 4 | Methyl acrylate (85), 2-ethylhexyl acrylate (10), allyl maleate (5) | 150 | 2.0 | 60 | $H_2O_2$ (2). |
| 5 [3] | Ethyl acrylate (177.2), crotyl acrylate (12.8), acrylonitrile (10) | 250 | 3.0 | 40 | $H_2O_2$ (1). |
| 6 | Methyl acrylate (61), butyl acrylate (30), furfuryl acrylate (4), acrylonitrile (5) | 250 | 2.5 | 130 | $H_2O_2$ (8.5). |

[1] Hydrogen peroxide was approximately 30%.
[2] Prepared by treating allyl lactate with maleic anhydride.
[3] Dodecyl mercaptan (0.25 ml.) also used.

Having thus described our invention, we claim:

1. A process of preparing a synthetic rubber comprising heating a mixture containing, as monomeric components, an alkyl acrylate and allyl lactate maleate in the proportion, by weight, of from 80 to 98% of the acrylate to at least 2% of the maleate, in the presence of dodecyl mercaptan and hydrogen peroxide, to effect copolymerization of the monomeric components, compounding the resulting copolymer with sulfur, and heating the compounded mixture to effect vulcanization.

2. A process of preparing a synthetic rubber comprising heating a mixture containing, as monomeric components, an alkyl acrylate and allyl lactate maleate in the proportion, by weight, of from 80 to 98% of the acrylate to at least 2% of the maleate, in the presence of a polymerization regulator adapted to retard cross-linkage and a polymerization catalyst, to effect copolymerization of the monomeric components, compounding the resulting copolymer with a rubber vulcanizing agent selected from the group conssiting of sulfur and benzoyl peroxide, and heating the compounded mixture to effect vulcanization.

3. A process of preparing a synthetic rubber comprising heating a mixture containing, as monomeric components, an alkyl acrylate and allyl lactate maleate in the proportion, by weight, of from 80 to 98% of the acrylate to at least 2% of the maleate, in the presence of a polymerization regulator adapted to retard cross-linkage, to effect copolymerization of the monomeric components, compounding the resulting copolymer with a rubber vulcanizing agent selected from the group consisting of sulfur and benzoyl peroxide, and heating the compounded mixture to effect vulcanization.

4. A process of preparing a synthetic rubber comprising heating a mixture containing, as monomeric components, an alkyl acrylate and allyl lactate maleate in the proportion, by weight, of from 80 to 98% of the acrylate to at least 2% of the maleate, to effect copolymerization of the monomeric components, compounding the resulting copolymer with a rubber vulcanizing agent, selected from the group consisting of sulfur and benzoyl peroxide, and heating the compounded mixture to effect vulcanization.

5. A process of preparing a synthetic rubber comprising heating a mixture containing, as monomeric components, an alkyl acrylate and an ester of an alkenyl lactate and a polybasic carboxylic acid in the proportion, by weight, of from 80 to 98% of the acrylate to at least 2% of the ester, to effect copolymerization of the monomeric components, compounding the resulting copolymer with a rubber vulcanizing agent selected from the group consisting of sulfur and benzoyl peroxide, and heating the compounded mixture to effect vulcanization.

WILLIAM C. MAST.
CHESSIE E. REHBERG.
CHARLES H. FISHER.

REFERENCES CITED

The following references are of record in the file of this patent:

UNITED STATES PATENTS

| Number | Name | Date |
|---|---|---|
| 1,121,134 | Rohm | Dec. 15, 1914 |
| 2,105,361 | Nowak | Jan. 11, 1938 |
| 2,202,846 | Garvey et al. | June 4, 1940 |

FOREIGN PATENTS

| Number | Country | Date |
|---|---|---|
| 496,276 | Great Britain | Nov. 28, 1938 |

OTHER REFERENCES

India Rubber World, April 1944, page 74.